US012654645B2

(12) United States Patent
Kim

(10) Patent No.: US 12,654,645 B2
(45) Date of Patent: Jun. 16, 2026

(54) APPARATUS FOR MOUNTING CURTAIN AIRBAG CUSHION

(71) Applicant: HYUNDAI MOBIS CO., LTD., Seoul (KR)

(72) Inventor: Ju Kyung Kim, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/264,358

(22) Filed: Jul. 9, 2025

(65) Prior Publication Data

US 2026/0152143 A1 Jun. 4, 2026

(30) Foreign Application Priority Data

Dec. 3, 2024 (KR) ........................ 10-2024-0177405

(51) Int. Cl.
B60R 21/201 (2011.01)
B60R 21/232 (2011.01)

(52) U.S. Cl.
CPC .......... B60R 21/201 (2013.01); B60R 21/232 (2013.01)

(58) Field of Classification Search
CPC ............................ B60R 21/201; B60R 21/232
See application file for complete search history.

(56) References Cited

U.S. PATENT DOCUMENTS

| | | | | |
|---|---|---|---|---|
| 5,791,683 A * | 8/1998 | Shibata | ................. | B60R 21/201 |
| | | | | 280/730.2 |
| 6,889,999 B2 * | 5/2005 | Dominissini | ......... | B60R 21/213 |
| | | | | 280/730.2 |
| 7,097,200 B2 * | 8/2006 | Wold | .................... | B60R 21/213 |
| | | | | 280/730.2 |
| 7,125,037 B2 * | 10/2006 | Tallerico | .............. | B60R 21/201 |
| | | | | 280/730.2 |
| 7,478,826 B2 * | 1/2009 | Soderquist | .............. | B60R 21/20 |
| | | | | 280/728.2 |
| 7,641,220 B2 * | 1/2010 | Visker | ................... | B60R 21/237 |
| | | | | 280/730.2 |
| 7,980,585 B2 * | 7/2011 | Cheal | .................... | B60R 21/201 |
| | | | | 280/730.2 |
| 8,240,701 B2 * | 8/2012 | Cheal | .................... | B60R 21/201 |
| | | | | 280/730.2 |
| 9,487,175 B2 * | 11/2016 | Noma | ................... | B60R 21/214 |
| 9,566,932 B2 * | 2/2017 | Tietze | .................. | B60R 21/217 |

FOREIGN PATENT DOCUMENTS

| | | | | | |
|---|---|---|---|---|---|
| JP | 3218966 | B2 * | 10/2001 | .......... | B60R 21/213 |
| KR | 20220132928 | A * | 10/2022 | .......... | B60R 21/201 |
| KR | 20230084931 | A * | 6/2023 | .......... | B60R 21/232 |

* cited by examiner

*Primary Examiner* — Faye M Fleming
(74) *Attorney, Agent, or Firm* — NovoTechIP International PLLC

(57) ABSTRACT

An apparatus for mounting a curtain airbag cushion according to one embodiment of the present invention includes a mounting tab coupled to a folded curtain airbag cushion, a mounting clip coupled to one surface of the mounting tab, configured to wrap around the curtain airbag cushion, and coupled to the other surface of the mounting tab, and a fixing member fastened by penetrating the mounting tab and the mounting clip.

9 Claims, 7 Drawing Sheets

APPARATUS FOR MOUNTING CURTAIN AIRBAG CUSHION

CROSS-REFERENCE TO RELATED APPLICATIONS

This application claims priority to and the benefit of Korean Patent Application No. 10-2024-0177405, filed on Dec. 3, 2024, the disclosure of which is incorporated herein by reference in its entirety.

TECHNICAL FIELD

The present invention relates to an apparatus for mounting a curtain airbag cushion, and more specifically, to an apparatus for mounting a curtain airbag cushion which fixes a folded curtain airbag cushion to a vehicle body.

BACKGROUND

Typically, vehicles are equipped with various types of airbag devices to protect passengers in the event of an accident. Among the various types of airbag devices, a curtain airbag device is a device that is installed at the upper side of each of a plurality of pillars disposed on side portions of a front door and a rear door and protects passengers by deploying an airbag cushion downward in case of vehicle rollover or side collision accident.

Such a curtain airbag device is usually equipped with a circularly folded airbag cushion fixed to an upper portion of a vehicle body pillar, and the folded airbag cushion is deployed by pressure of an airbag gas generated at an inflator to protect a passenger's upper body including the head.

Conventionally, when a curtain airbag cushion was fixed to a vehicle body, the curtain airbag cushion was fixed by fastening a bolt to a mounting tab formed of a fabric material. In this case, there was a possibility that the curtain airbag cushion would be assembled in a twisted state due to severe left-right movement of the mounting tab because the mounting tab itself was formed of the flexible material. Accordingly, assembly may be possible when the curtain airbag cushion is twisted by compensating for a reduced installation length caused by twisting the curtain airbag cushion with an amount of the left-right movement of the mounting tab.

In addition, there was a problem that, since the mounting tab was formed of a soft fabric material, the mounting tab sagged caused by a weight of a bolt and a clip for preventing rotation, which reduced assemblability.

SUMMARY

The present invention is directed to providing an apparatus for mounting a curtain airbag cushion capable of preventing sagging of a curtain airbag cushion and stably supporting the curtain airbag cushion by wrapping around the curtain airbag cushion while a mounting clip is coupled to a mounting tab.

The present invention is also directed to an apparatus for mounting a curtain airbag cushion capable of preventing left-right movement of the mounting tab and the curtain airbag cushion by inserting and fixing a fixing pin provided in a mounting clip into and at the mounting tab.

The problems to be solved by the present invention are not limited to the problems described above, and other problems not described herein will be clearly understood by those skilled in the art from the description below.

According to an aspect of the present invention, there is provided an apparatus for mounting a curtain airbag cushion including a mounting tab coupled to a folded curtain airbag cushion, a mounting clip coupled to one surface of the mounting tab, formed to wrap around the curtain airbag cushion, and coupled to the other surface of the mounting tab, and a fixing member fastened by penetrating the mounting tab and the mounting clip.

The mounting clip may include a main body coupled to the one surface of the mounting tab, a strap portion configured to extend from an end portion of the main body to wrap around and support the curtain airbag cushion, and a coupling portion configured to extend from an end portion of the strap portion and coupled to the mounting tab and the main body.

A through hole through which a fixing pin provided to protrude from the main body passes may be formed in the mounting tab and the coupling portion.

A pair of fixing pins may be formed spaced apart in a left-right direction in the main body.

Support guides that are fitted to support both sides of the mounting tab may be provided to protrude from the main body.

A fixing guide that supports an upper end of the mounting tab may be provided to protrude from an upper end of the main body.

A first fastening hole and a second fastening hole through which the fixing member passes and to which it is fastened may be formed corresponding to each other in the main body and the coupling portion.

A cut hole may be formed by cutting an inner side of the strap portion in a width direction.

A rotation preventing member may be coupled between the fixing member and the mounting clip to prevent the fixing member from rotating in a fastening release direction.

In the rotation preventing member, an insertion portion that is inserted into a first rotation preventing hole formed in the main body, a second rotation preventing hole formed in the coupling portion, and a tab rotation preventing hole formed in the mounting tab is bent and extended.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

The present invention may have various modifications and embodiments, and specific embodiments are exemplified and described in the accompanying drawings. However, the specific embodiments are not intended to limit the present invention, and should be understood to include all modifications, equivalents, or substitutes included in the spirit and technical scope of the present invention. In explaining the present invention, when it is determined that a detailed description of a related known technology may obscure the gist of the present invention, the detailed description thereof will be omitted.

Terms such as second, first, or the like may be used to describe various components, but the components are not limited by the terms. The terms are used solely to distinguish one component from another.

The terminology used in this application is only used to describe specific embodiments and is not intended to limit the present invention. The singular expression includes the plural expression unless the context clearly indicates otherwise. In this application, it should be understood that terms such as "include" and "have" are intended to specify the presence of a feature, number, step, operation, component, part, or combination thereof described in the specification, but do not exclude in advance the possibility of the presence or addition of one or more other features, numbers, steps, operations, components, parts, or combinations thereof.

Additionally, throughout the specification, "connected" does not only mean that two or more components are directly connected, but can also mean that two or more components are indirectly connected through another component, that two or more components are electrically connected as well as physically connected, or that they are integrally formed although they are referred to different names according to a location or function.

Additionally, when a component is described as being formed or disposed "on (above) or below (under)" another component, "above" or "below" includes not only cases in which the two components are in direct contact with each other, but also cases in which one or more other components are formed or disposed between the two components. Additionally, when expressed as "above or below," it can include the meaning of not only the upward direction but also the downward direction based on one component.

Hereinafter, one embodiment of an apparatus for mounting a curtain airbag cushion according to the present invention will be described in detail with reference to the attached drawings. When describing with reference to the attached drawings, identical or corresponding components are assigned the same reference numbers and redundant descriptions thereof will be omitted.

Figure 1:
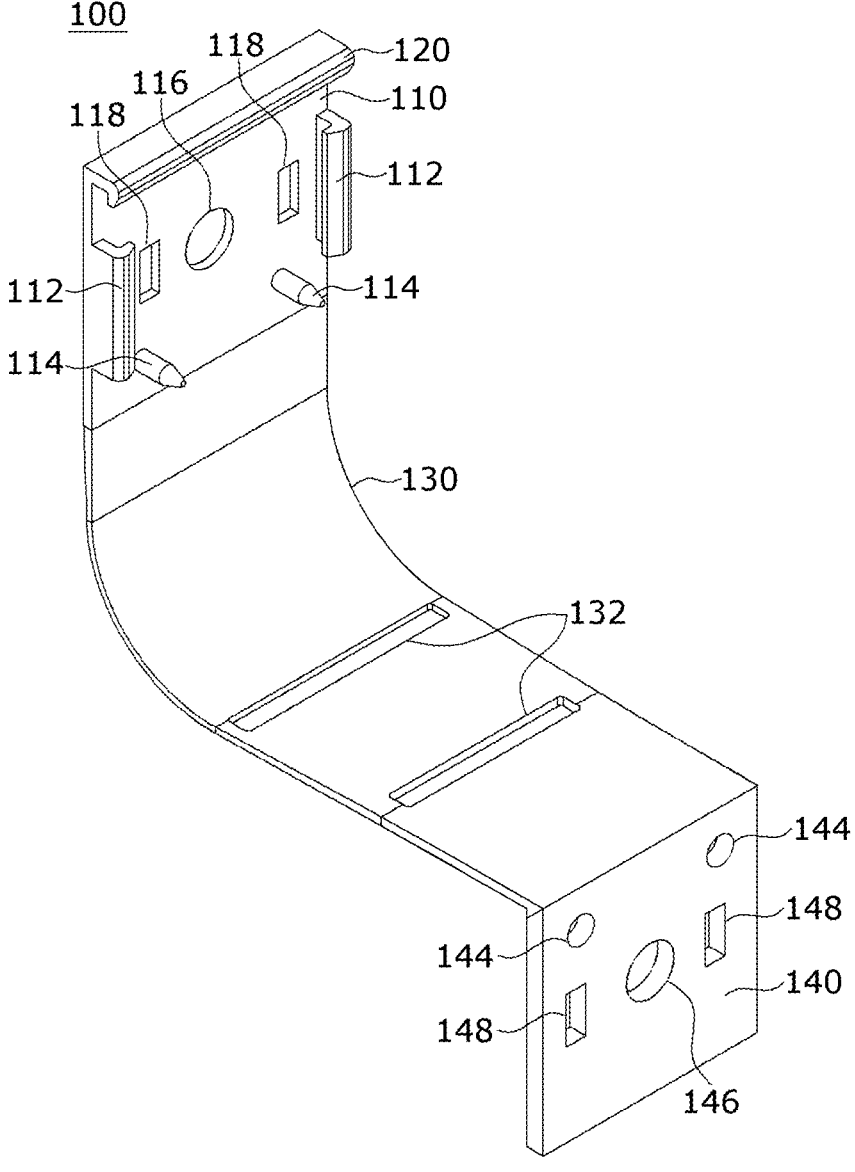
FIG. 1 is a diagram illustrating a state before fastening of a mounting clip according to an embodiment of the present invention.
Figure 2:
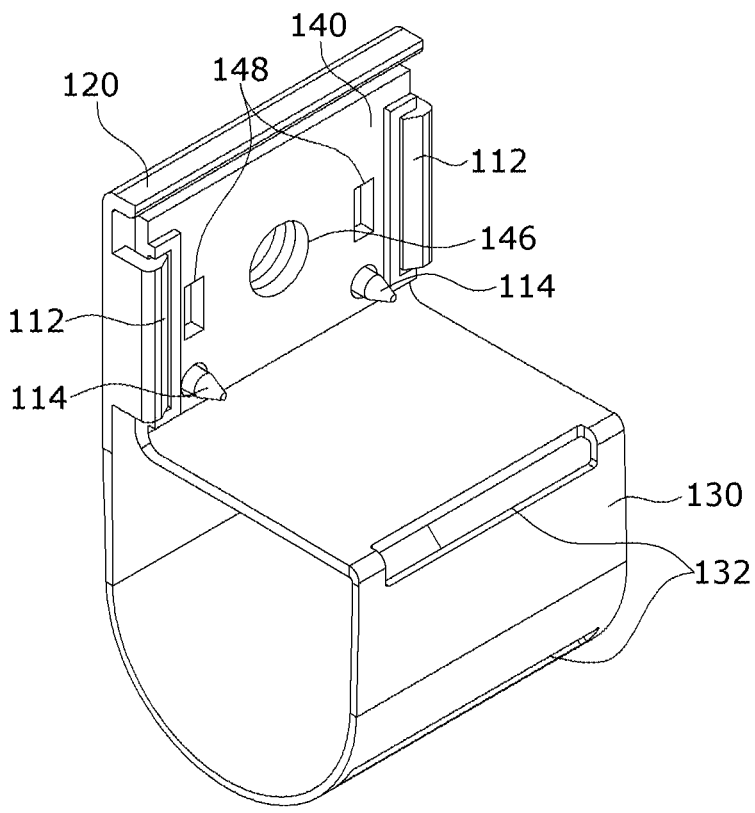
FIG. 2 is a diagram showing a state after fastening of the mounting clip according to the embodiment of the present invention.
Figure 4:
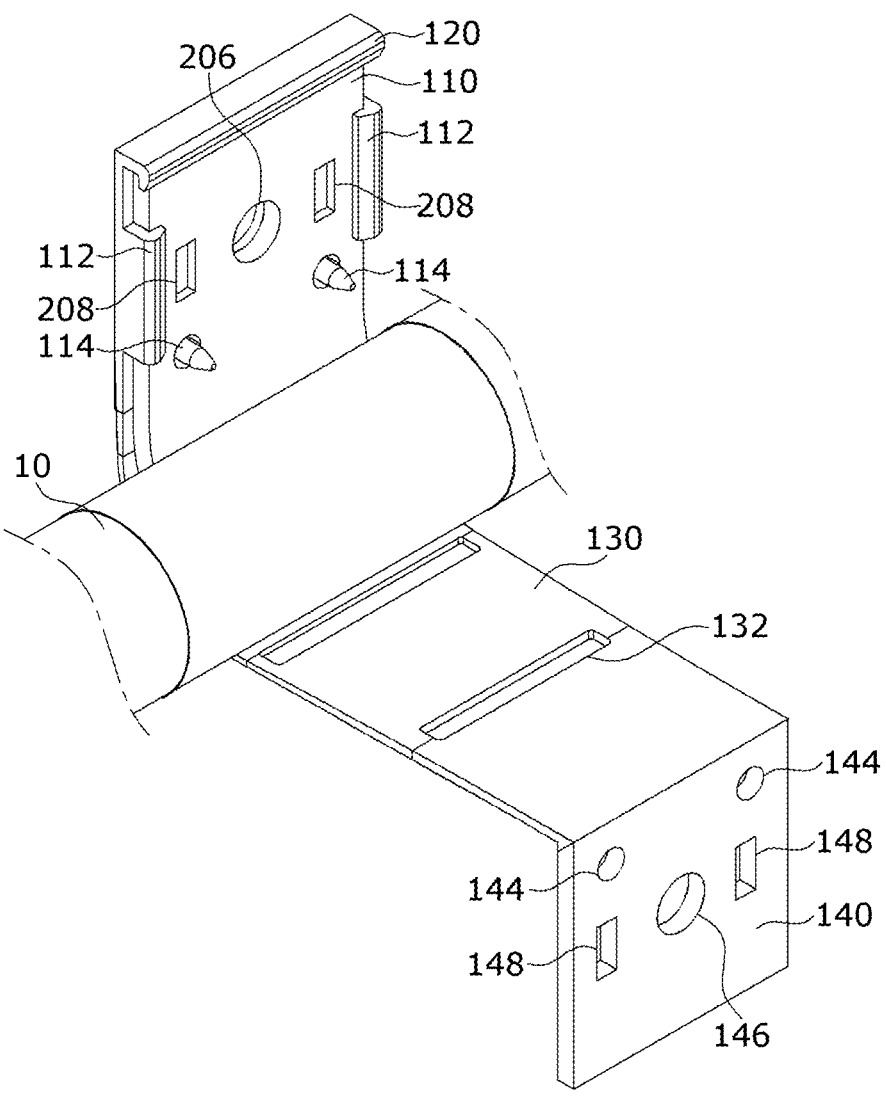
Figure 5:
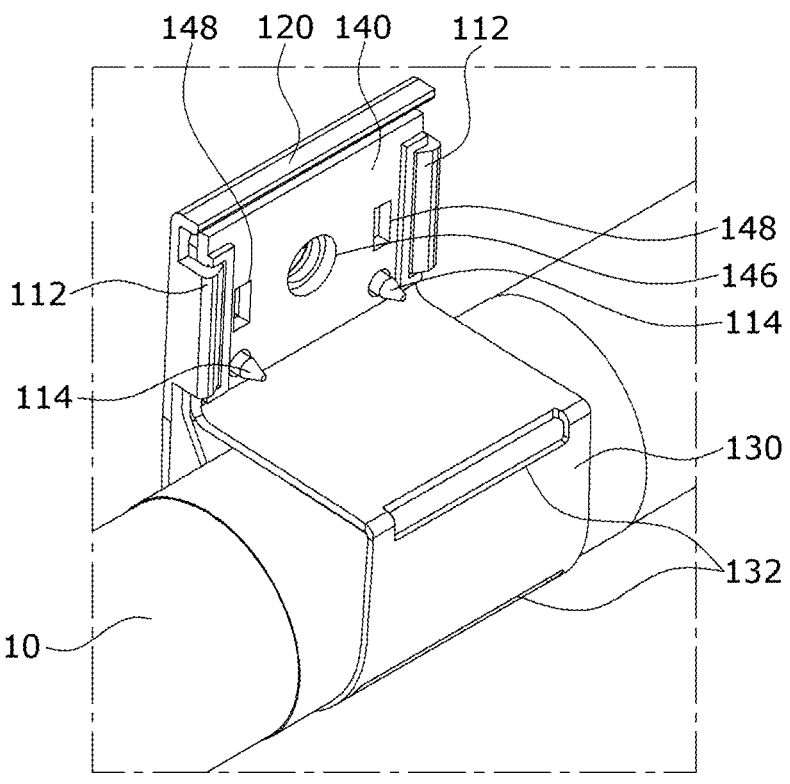
Figure 6:
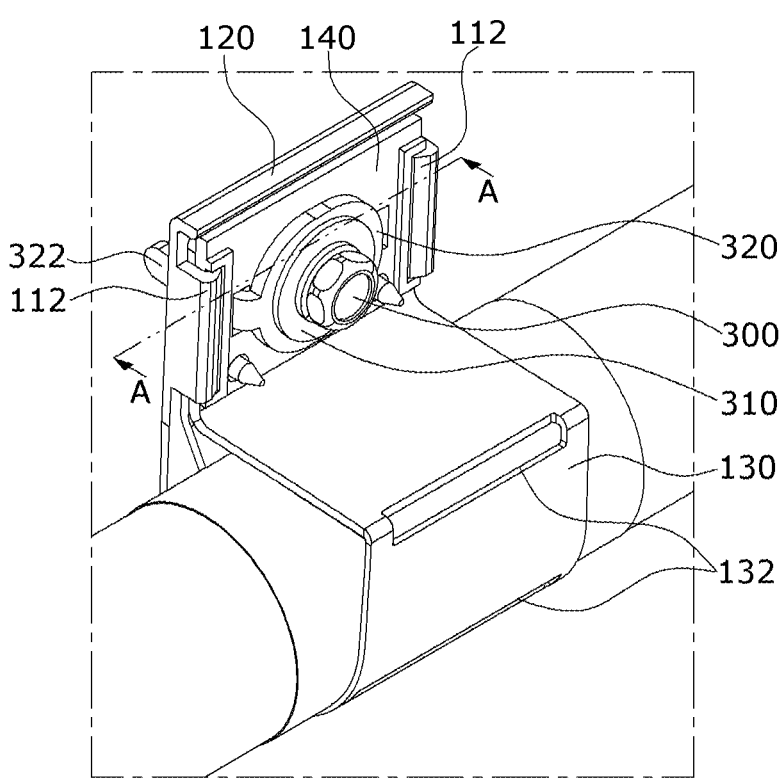
Figure 7:
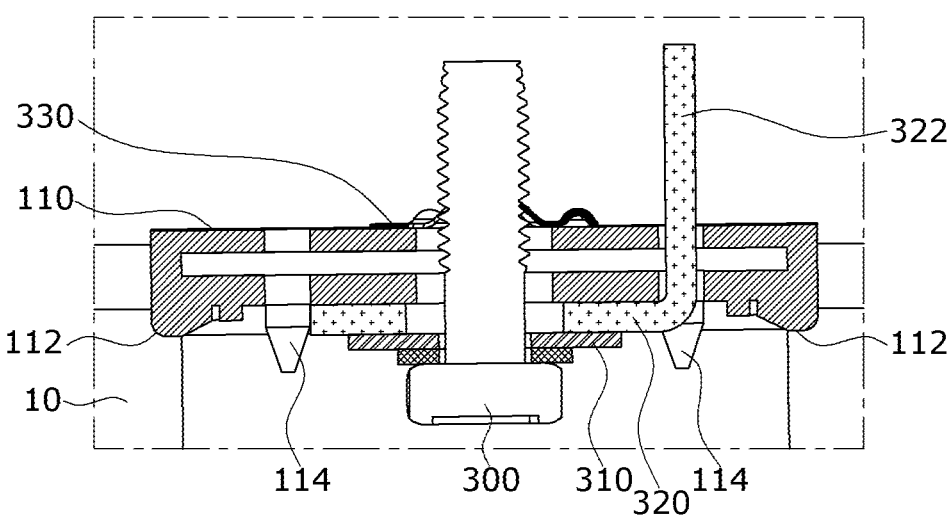
FIG. 7 is a cross-sectional view taken along line A-A illustrated in FIG. 6.

FIG. 1 is a diagram illustrating a state before fastening of a mounting clip according to an embodiment of the present invention, FIG. 2 is a diagram showing a state after fastening of the mounting clip according to the embodiment of the present invention, FIGS. 3 to 6 are diagrams illustrating a process of fixing a curtain airbag cushion with an apparatus for mounting a curtain airbag cushion according to an embodiment of the present invention, and FIG. 7 is a cross-sectional view taken along line A-A illustrated in FIG. 6.

As illustrated, an apparatus for mounting a curtain airbag cushion according to the embodiment of the present invention includes a mounting tab 200 coupled to a folded curtain airbag cushion 10, a mounting clip 100 coupled to one (first) surface of the mounting tab 200, wrapping around the curtain airbag cushion 10, and coupled to the other (second) surface of the mounting tab 200, and a fixing member 300 that is fastened by passing through the mounting tab 200 and the mounting clip 100.

A curtain airbag device of a vehicle includes an inflator (not illustrated) that generates an airbag gas, and the curtain airbag cushion 10 that is inflated and deployed by injecting the airbag gas. The inflator and the curtain airbag cushion 10 are installed to be located at a vehicle body on the upper side of a vehicle pillar, and when in operation, the curtain airbag cushion 10 is deployed downward to protect passengers. The apparatus can be used when the curtain airbag cushion 10 is installed to be fixed to the vehicle body on the upper side of the vehicle pillar.

The mounting clip 100 may include a main body 110 coupled to one surface of the mounting tab 200, a strap portion 130 that extends from an end portion of the main body 110 to wrap around and support the curtain airbag cushion 10, and a coupling portion 140 that extends from an end portion of the strap portion 130 and is coupled to the main body 110.

The mounting clip 100 may have a quadrangular plate shape that is long in one direction and may be manufactured of a synthetic resin material to wrap around the curtain airbag cushion 10 elastically.

The mounting clip 100 is a part that actually wraps around and fixes the curtain airbag cushion 10. The main body 110 of the mounting clip 100 is a part that is coupled when the mounting clip 100 is temporarily fixed to the mounting tab 200. Here, the provisional fixation of the mounting clip 100 refers to a state in which the mounting clip 100 is coupled to a rear surface of the mounting tab 200 and the strap portion 130 has not yet wrapped the curtain airbag cushion 10.

The main body 110 may be coupled to be in contact with one surface of the mounting tab 200, for example, the rear side of the mounting tab 200. Support guides 112 are provided to protrude on both sides of the main body 110, and the support guides 112 support the mounting tab 200 on both sides. The support guides 112 may be provided to protrude forward from both sides of the main body 110 with a predetermined thickness. The support guide 112 may extend to occupy at least part of the both sides of the main body 110. Tip ends of the support guides 112 are bent and extended in directions facing each other, thereby preventing the mounting tab 200 coupled therebetween from being separated or moving in a front-rear direction.

The main body 110 is provided with a fixing pin 114 that is inserted into a through hole 204 formed in the mounting tab 200 and protrudes. The fixing pin 114 protrudes forward from the main body 110, and a pair of fixing pins 114 may be disposed in a left-right direction. When the mounting clip 100 is provisionally fixed to the mounting tab 200, the main body 110 is coupled while coming into contact with the rear surface of the mounting tab 200, and in this case, the fixing pin 114 is inserted into the through hole 204 and passes forward therethrough. In this way, when the pair of fixed pins 114 are inserted into the through holes 204, the mounting tab 200 and the curtain airbag cushion 10 can be prevented from moving left and right when the mounting clip 100 is coupled.

A first fastening hole 116 is formed in the center of the main body 110. The first fastening hole 116 is formed to correspond to a tab fastening hole 206 of the mounting tab 200, and is a portion through which the fixing member 300 passes for fastening.

A first rotation preventing hole 118 is formed in the main body 110. A pair of first rotation preventing holes 118 may be formed on both sides of the first fastening hole 116. The first rotation preventing hole 118 is a portion into which an insertion portion 322 of a rotation preventing member 320 which will be described below is inserted, and when the rotation preventing member 320 is coupled, the fixing member 300 is prevented from being released by rotating in a fastening release direction (for example, counterclockwise). The first rotation preventing holes 118 may be formed on the both sides of the first fastening hole 116 so that the insertion portion 322 can be inserted on either the left or right side.

A fixing guide 120 may be provided on an upper end of the main body 110 to protrude forward. The fixing guide 120 is a portion formed to support up and down movement of the mounting tab 200 when coupled to the mounting tab 200, and may be provided to protrude across the upper end of the main body 110. In one embodiment, the fixing guide 120 may be extended perpendicularly to the main body 110 by bending forward at the upper end of the main body 110. The fixing guide 120 may be extended to be bent downward. As an example, the fixing guide 120 may be provided to extend a predetermined length in the left-right direction from the upper end of the main body 110.

The strap portion 130 is a portion that actually wraps around the curtain airbag cushion 10, as described above, is made of a synthetic resin material, and wraps around the curtain airbag cushion 10 elastically. In this way, the strap portion 130 that wraps around the curtain airbag cushion 10 prevents the folded curtain airbag cushion 10 from sagging and maintains a folded shape thereof as it is.

The strap portion 130 may have a sufficient length to wrap around the curtain airbag cushion 10. A cut hole 132 may be formed in the strap portion 130 to ensure good elastic deformation. The cut hole 132 is formed by cutting the inner side of the strap portion 130 in a width direction, and a plurality of cut holes may be formed spaced apart in a longitudinal direction of the strap portion 130.

The coupling portion 140 may extend from an end portion of the strap portion 130 and be coupled to the main body 110 when finally coupled to the mounting tab 200. A through hole 144 through which the fixing pin 114 formed in the main body 110 passes is formed in the coupling portion 140. In addition, a second fastening hole 146 and a second rotation preventing hole 148 corresponding to the first fastening hole 116 and the first rotation preventing hole 118 of the main body 110 may be formed.

The coupling portion 140 may have a size corresponding to a size of the main body 110, may be perpendicularly bent and extended from an end portion of the strap portion 130 to come into contact with and be connected to a front surface of the mounting tab 200 when the strap portion 130 is wrapped.

Figure 3:
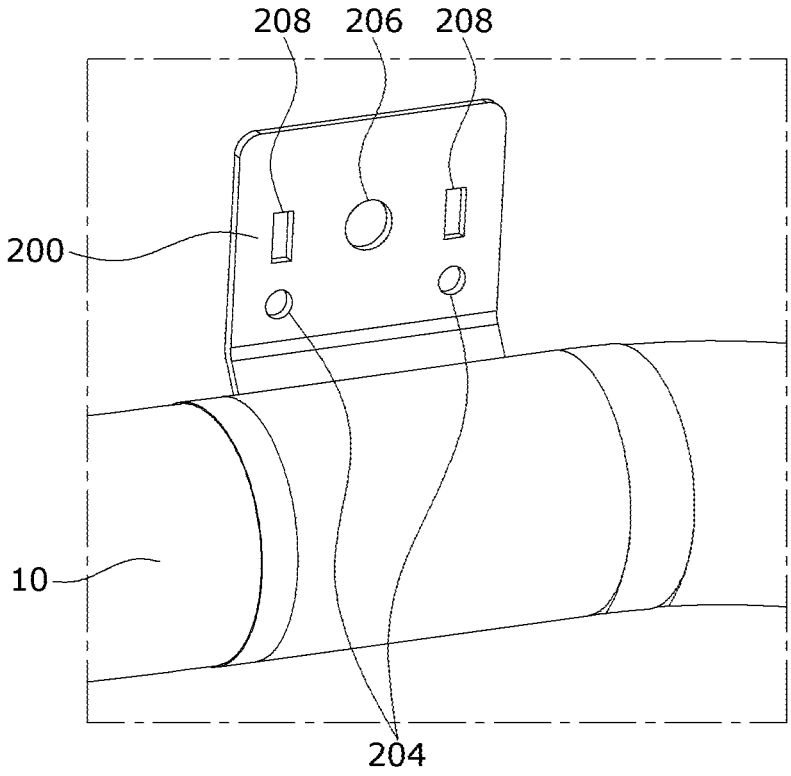
FIGS. 3 to 6 are diagrams illustrating a process of fixing a curtain airbag cushion with an apparatus for mounting a curtain airbag cushion according to an embodiment of the present invention.

Referring to FIG. 3, a lower portion of the mounting tab 200 may be sewn to be coupled to the curtain airbag cushion 10. The mounting tab 200 may have a quadrangular plate shape and may be made of a metal material, but is not limited thereto.

The mounting tab 200 is formed with a through hole 204 into which the fixing pin 114 is inserted and through which it is penetrated. Additionally, in the mounting tab 200, a tab fastening hole 206 corresponding to the first fastening hole 116 is formed, and a tab rotation preventing hole 208 corresponding to the first rotation preventing hole 118 is formed.

Referring to FIG. 6, the fixing member 300 is fastened by penetrating the mounting tab 200 and the mounting clip 100 for final coupling of the mounting clip 100 and the mounting tab 200. In the embodiment, the fixing member 300 is presented as a fastening bolt, but is not limited thereto, and any fastening member for coupling may be applied. The fixing member 300 is fastened to the upper side of the pillar of the vehicle to support the curtain airbag cushion 10.

When the fixing member 300 is fastened, a washer 310 and the rotation preventing member 320 may be fastened together. The rotation preventing member 320 is fastened to prevent the fastened fixing member 300 from rotating in the fastening release direction, and the insertion portion 322 that is bent and extended from one side is inserted into and passes through the first rotation preventing hole 118, the second rotation preventing hole 148, and the tab rotation preventing hole 208. In one embodiment, the insertion portion 322 may be bent perpendicularly and extended from one side of the rotation preventing member 320.

Hereinafter, a process of fixing the curtain airbag cushion with the apparatus for mounting a curtain airbag cushion will be described with reference to FIGS. 3 to 6.

First, referring to FIG. 3, a worker sews to couple the mounting tab 200 to the curtain airbag cushion 10. Referring to FIG. 4, the coupling is performed so that the rear surface of the mounting tab 200 comes into contact with the front surface of the main body 110, and the strap portion 130 is disposed to extend forward along the lower side of the curtain airbag cushion 10. In this case, the provisional fixation of the mounting clip 100 and the mounting tab 200 is achieved by the fixing pin 114 passing through the through hole 204, and both sides of the mounting tab 200 are supported by the support guides 112, and the upper end of the mounting tab 200 can be supported by the fixing guide 120.

Referring to FIG. 5, while the strap portion 130 is elastically deformed, the strap portion 130 is rotated to wrap around the curtain airbag cushion 10. In this case, the coupling portion 140 is located on the front surface of the mounting tab 200 as illustrated in the drawing. In this state, as illustrated in FIG. 6, the insertion portion 322 of the rotation preventing member 320 is inserted through the first rotation preventing hole 118, the second rotation preventing hole 148, and the tab rotation preventing hole 208 to be fixed, and the fixing member 300 is fastened together with the washer 310. The fixing member 300 is coupled to the upper side of the pillar of the vehicle body to support the curtain airbag cushion 10.

Referring to FIG. 7, the curtain airbag cushion 10 is illustrated in a fixed state. The fixing member 300 is fastened by passing through the coupling portion 140, the mounting tab 200, and the main body 110 in sequence, and a push retainer 330 may be fastened to the opposite side of the fixing member 300. Here, the push retainer 330 is illustrated as a fixing member of the fixing member 300, but is not limited thereto, and various fixing members such as a one-touch clip may be used.

According to one embodiment of the present invention, since the mounting clip wraps around the curtain airbag cushion while being coupled to the mounting tab, the curtain airbag cushion can be prevented from sagging, and stably supported.

In addition, according to one embodiment of the present invention, since the fixing pin provided in the mounting clip is inserted into and fixed in the mounting tab, left-right movement of the mounting tab and the curtain airbag cushion can be prevented.

Although the present invention has been described above with reference to a specific embodiment, it will be understood by those skilled in the art that various modifications and changes may be made to the present invention without departing from the gist and scope of the present invention as set forth in the claims below.

What is claimed is:

1. An apparatus for mounting a curtain airbag cushion, comprising:

a mounting tab coupled to a folded curtain airbag cushion and having first and second surfaces respectively facing in mutually opposite directions;

a mounting clip configured to wrap around the curtain airbag cushion and comprising:

a main body disposed on the first surface of the mounting tab;

a strap portion extending from the main body and configured to wrap around and support the folded curtain airbag cushion; and a coupling portion extending from the strap portion and disposed on the second surface of the mounting tab; and a fixing member penetrating through the first and second surfaces of the mounting tab and the main body and the coupling portion of the mounting clip and configured to fasten the mounting tab and the mounting clip.

2. The apparatus of claim 1, wherein:

the mounting tab and the coupling portion collectively have a through hole extending therethrough, and the apparatus further comprises a fixing pin protruding from the main body and passing through the through hole.

3. The apparatus of claim 2, wherein the main body includes a pair of fixing pins spaced apart from each other in a left-right direction.

4. An apparatus for mounting a curtain airbag cushion, comprising:

a mounting tab coupled to a folded curtain airbag cushion and having first and second surfaces;

a mounting clip coupled to the first surface of the mounting tab, configured to wrap around the curtain airbag cushion, and coupled to the second surface of the mounting tab;

a fixing member penetrating through the mounting tab and the mounting clip and configured to fasten the mounting tab and the mounting clip; and a plurality of support guides protruding from a main body of the mounting clip and configured to support the first and second surfaces of the mounting tab.

5. An apparatus for mounting a curtain airbag cushion, comprising:

a mounting tab coupled to a folded curtain airbag cushion and having first and second surfaces;

a mounting clip coupled to the first surface of the mounting tab, configured to wrap around the curtain airbag cushion, and coupled to the second surface of the mounting tab;

a fixing member penetrating through the mounting tab and the mounting clip and configured to fasten the mounting tab and the mounting clip; and a fixing guide protruding from an upper end of a main body of the mounting clip and configured to support an upper end of the mounting tab.

6. The apparatus of claim 1, wherein:

the main body and the coupling portion respectively have a first fastening hole and a second fastening hole arranged corresponding to each other, and the fixing member passes through and is fastened to the first fastening hole and the second fastening hole.

7. The apparatus of claim 1, wherein the strap portion has a cut hole on an inner side of the strap portion.

8. The apparatus of claim 1, further comprising a rotation preventing member coupled between the fixing member and the mounting clip and configured to prevent the fixing member from rotating in a fastening release direction.

9. The apparatus of claim 8, wherein in the rotation preventing member, an insertion portion, which is inserted into a first rotation preventing hole formed in the main body, a second rotation preventing hole formed in the coupling portion, and a tab rotation preventing hole formed in the mounting tab, is bent and extended.

* * * * *